United States Patent
Haxell

(10) Patent No.: US 6,577,416 B1
(45) Date of Patent: Jun. 10, 2003

(54) CHANNEL CONTROL IN A WAVELENGTH DIVISION MULTIPLEXED COMMUNICATIONS NETWORK

(75) Inventor: Ian Haxell, Delray, FL (US)

(73) Assignee: Alcatel, Nanterre (FR)

( * ) Notice: Subject to any disclaimer, the term of this patent is extended or adjusted under 35 U.S.C. 154(b) by 0 days.

(21) Appl. No.: 09/341,779

(22) PCT Filed: Nov. 23, 1998

(86) PCT No.: PCT/EP98/07813

§ 371 (c)(1),
(2), (4) Date: Sep. 13, 1999

(87) PCT Pub. No.: WO99/27665

PCT Pub. Date: Jun. 3, 1999

(30) Foreign Application Priority Data

Nov. 24, 1997 (GB) .............................................. 9724822

(51) Int. Cl.⁷ ............................................. H04J 14/02
(52) U.S. Cl. ........................ 359/127; 359/124; 359/133
(58) Field of Search .................. 359/127, 124, 359/133, 161, 181; 385/140

(56) References Cited

U.S. PATENT DOCUMENTS

| | | | | |
|---|---|---|---|---|
| 5,548,654 A | * | 8/1996 | Fast | 381/77 |
| 5,745,271 A | * | 4/1998 | Ford et al. | 359/130 |
| 5,790,289 A | * | 8/1998 | Taga et al. | 359/124 |
| 5,877,879 A | * | 3/1999 | Naito | 359/133 |
| 6,151,157 A | * | 11/2000 | Ball et al. | 359/341 |
| 6,160,659 A | * | 12/2000 | Kinoshita | 359/337 |
| 6,185,022 B1 | * | 2/2001 | Harasawa | 359/124 |

FOREIGN PATENT DOCUMENTS

| | | | | |
|---|---|---|---|---|
| GB | 2 303 984 A | * | 3/1996 | H04B/10/18 |
| JP | 8-321824 | * | 12/1996 | |
| WO | WO 97/06616 | * | 2/1997 | H04J/14/02 |

* cited by examiner

*Primary Examiner*—John Tweel
(74) *Attorney, Agent, or Firm*—Sughrue Mion, PLLC

(57) ABSTRACT

Multi-wavelength optically amplified systems require selected premphasis of channel power to equalise signal to noise ratios at the receive terminal end. In the present invention, a channel control circuit or an optical wavelength division multiplexed (WDM) communications system (14) is constituted by an optical coupler (2) having an optical input, an optical output and an arm coupled to a wavelength multiplexer (5). The multiplexer (5) de-multiplexes an optical signal into a number of separate channels which are then each coupled to a respective optical attenuator ($6_n$) which processes the individual channel and then returns them to the optical output via the multiplexer (5).

11 Claims, 2 Drawing Sheets

CHANNEL CONTROL IN A WAVELENGTH DIVISION MULTIPLEXED COMMUNICATIONS NETWORK

BACKGROUND TO THE INVENTION

Multi-wavelength optically amplified systems require selective pre-emphasis of channel powers to equalise signal to noise ratios at the receive terminal end. In one known architecture, individual channel powers are controlled by a respective optical attenuator or optical amplifier in the transmit tributary path prior to combining. This has the disadvantage that after setting each channel power, relative drifts in the output powers of the tributary components and/or changes to the spectral characteristics of the following aggregate path components can upset the pre-emphasis which results in a system signal to noise impairment in one or more channels.

SUMMARY OF THE INVENTION

According to a first aspect of the present invention, a channel control circuit for an optical wavelength division multiplexed (WDM) communications system comprises:
  an optical coupling means having an optical input and an optical output;
  an optical multiplexer for demultiplexing a WDM optical signal received at the optical input into separate channels;
  a number of optical gain control elements for controlling the signal power of a respective channel to provide pre-emphasis control; and,
  means for coupling each of the channels via a respective return path through the optical multiplexer to the optical output, where the channels appear as a WDM optical signal.

The present invention addresses problems associated with conventional tributary path channel control. The use of an optical coupler in combination with a WDM multiplexer enables pre-emphasis of the individual channels in a WDM optical signal to be carried out in the aggregate path and provides a compact and cost effective solution with minimal insertion loss. The WDM optical signal is demultiplexed and the relative powers of the individual channels set accordingly. The channels are subsequently multiplexed in a return path through the same multiplexer so that the output signal is a WDM signal with the required degree of pre-emphasis in each channel. The arrangement also has a degree of tributary independence in that a failure in one path carrying one channel will not totally remove the other channels.

Preferably, the optical gain control elements comprise optical attenuators. More preferably, each optical attenuator comprises a feedback circuit for providing active gain control to maintain channel power substantially at a predetermined level.

Preferably, each optical attenuator is coupled to an optical reflector for reflecting the optical signal along a return path to the optical multiplexer.

The optical multiplexer may, for example, be of a type manufactured using either multilayer dielectric or array waveguide interference technology.

Preferably, the channel control circuit comprises an optical circulator arranged to couple an optical signal between the optical input and the optical multiplexer, and between the optical multiplexer and the optical output. This form of optical coupler provides inherent optical isolation for the control circuit. As an alternative, a 3 dB coupler may be used.

According to a second aspect of the present invention, a transmit terminal for an optical wavelength division multiplexed (WDM) communications system comprises a channel control circuit in accordance with the first aspect of the present invention.

According to a third aspect of the present invention, a receive terminal for an optical wavelength division multiplexed (WDM) communications system comprises a channel control circuit in accordance with the first aspect of the present invention.

Preferably, the terminal further comprises an optical amplifier coupled to the optical output of the optical coupling means.

According to a fourth aspect of the present invention, an optical wavelength division multiplexed communications system comprises a terminal according to either of the second and third aspects of the present invention.

BRIEF DESCRIPTION OF THE DRAWINGS

An example of the present invention will now be described in detail with reference to the accompanying drawings, in which.

DETAILED DESCRIPTION

Figure 1:
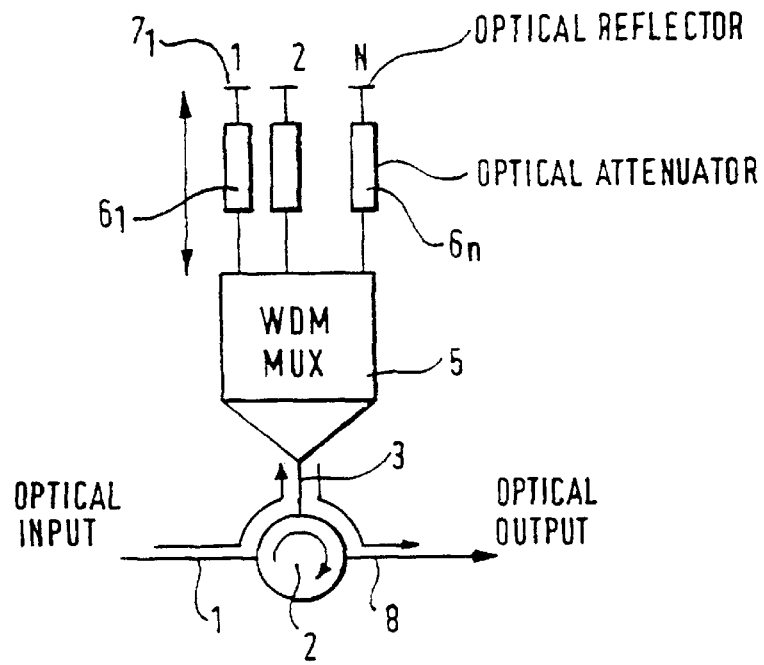
FIG. 1 is a block diagram of an example of a channel pre-emphasis control circuit in accordance with the present invention.

FIG. 1 is a block diagram of a first example of a channel pre-emphasis control circuit. In FIG. 1, an optical WDM signal entering on a first arm 1 of an optical circulator 2 passes to a second arm 3 forming the aggregate path 4 of a wavelength multiplexer 5. Only that wavelength corresponding to arm #1 will pass through the voltage controlled optical attenuator $6_1$, in arm #1 and be reflected back by the corresponding optical reflector $7_1$ in that arm through the same attenuator and be wavelength combined at the aggregate path 4 of the wavelength multiplexer 5 again. Finally, the light passes onto the third (output) arm 8 of the optical circulator 2. The same function is carried out by each of the respective N-1 remaining arms of the wavelength multiplexer. Accordingly, each wavelength will be independently controlled by its respective optical attenuator $6_n$.

Figure 2:
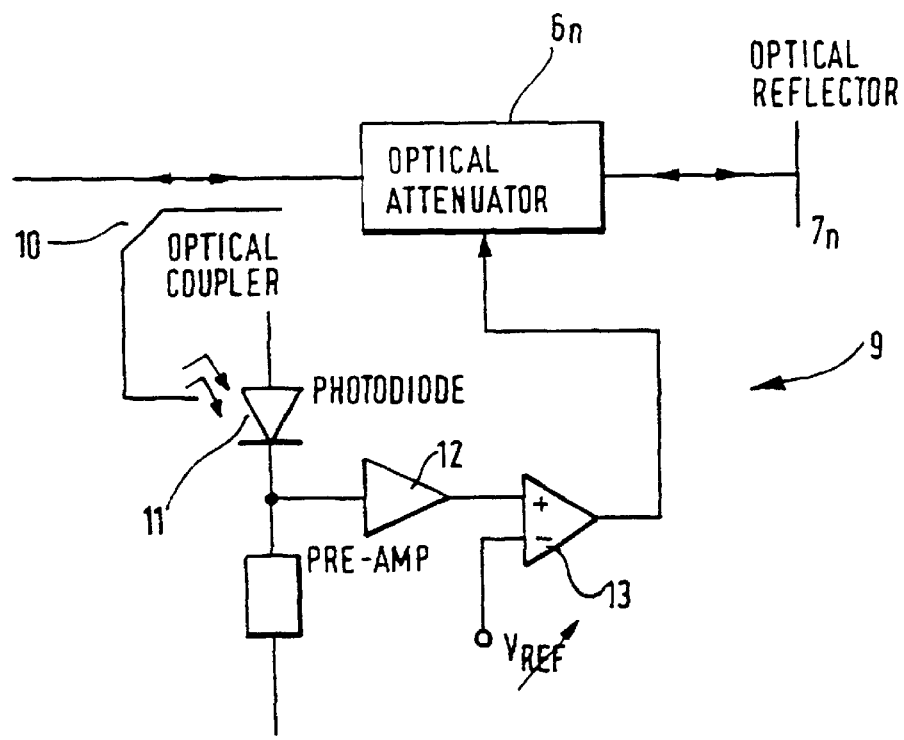
FIG. 2 is a block diagram of an optical attenuator incorporating a negative feedback control loop for use in the channel pre-emphasis control circuit of FIG. 1; and, FIG. 3 is a block diagram of a WDM communications system having transmit and receive terminals which incorporate channel pre-emphasis control circuits in accordance with the present invention.

As shown in FIG. 2, the optical attenuators $6_n$ form part of a simple local control loop to preserve the relative pre-emphasis levels of the individual channels, so that for an N channel system only N-1 attenuators would be required. Each optical attenuator $6_n$ includes a negative feedback control loop 9 comprising an optical coupler 10 to split a portion of the output of the attenuator onto the negative feedback loop, and a photodiode 11 to detect the split portion. The signal is pre-amplified by an amplifier 12 and the output fed to a comparator 13 which uses a voltage reference source to provide a signal to control the gain of the attenuator.

Figure 3:
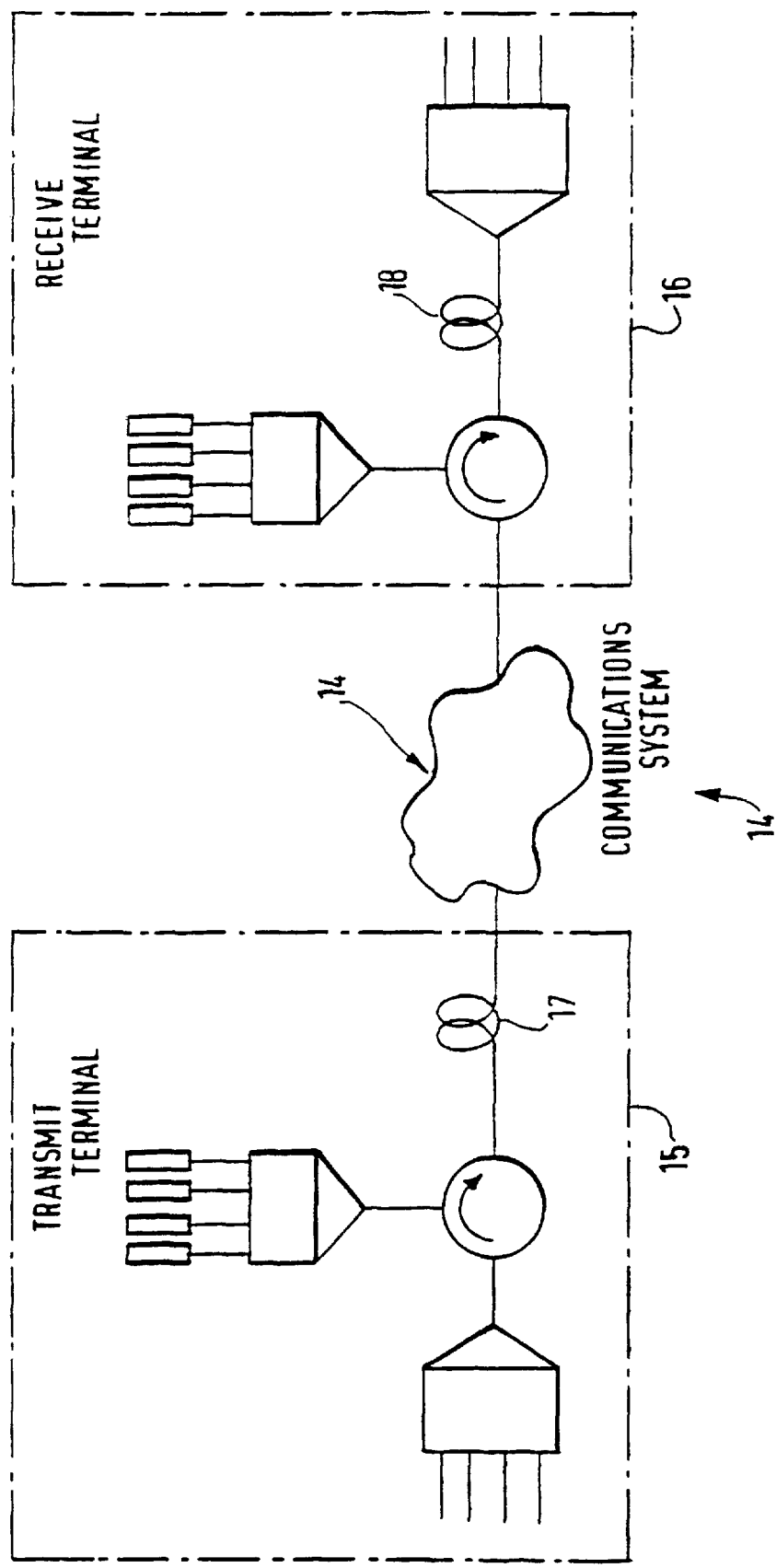

FIG. 3 shows a WDM communications system 14 having a transmit terminal 15 at one end station and a receive terminal 16 at another end station. Each of the transmit terminal 15 and receive terminal 16 has a channel pre-emphasis control circuit as shown in and described above with reference to FIG. 2. In each case the output from the pre-emphasis circuit is amplified by only a single erbium doped fibre amplifier EDFA 17 and 18, respectively. Accordingly, the relative signal levels are adjusted before amplification of the aggregate path thus avoiding degradation of the lower-level signals which will be proportionately more affected by any amplifier noise which may be generated. Furthermore, since only a single EDFA is used in each terminal, the component count for the terminals is substantially less than that of conventional transmit and receive terminals in which individual channels are amplified before they are multiplexed.

What is claimed is:

1. A channel control circuit for an optical wavelength division multiplexed (WDM) communications system comprising:
    an optical coupling means having an optical input and an optical output;
    an optical multiplexer for demultiplexing a WDM optical signal received at the optical input into separate channels;
    a number of optical gain control elements for controlling the signal power of a respective channel to provide pre-emphasis control; and,
    means for coupling each of the channels via a respective return path through the optical multiplexer to the optical output, where the channels appear as a WDM optical signal.

2. A channel control circuit according to claim 1, in which the optical gain control elements comprise optical attenuators.

3. A channel control circuit according to claim 2, in which each optical attenuator comprises a feedback circuit for providing active gain control to maintain channel power substantially at a predetermined level.

4. A channel control circuit according to claim 2, in which each optical attenuator is coupled to an optical reflector for reflecting the optical signal along a return path to the optical multiplexer.

5. A channel control circuit according to claim 1, further comprising an optical circulator arranged to couple an optical signal between the optical input and the optical multiplexer, and between the optical multiplexer and the optical output.

6. A transmit terminal for an optical wavelength division multiplexed (WDM) communications system, comprising a channel control circuit according to claim 1.

7. A receive terminal for an optical wavelength division multiplexed (WDM) communications system, comprising a channel control circuit according to claim 1.

8. A transmit terminal according to claim 6, further comprising an optical amplifier coupled to the optical output of the optical coupling means.

9. An optical wavelength division multiplexed communications system comprising a transmit terminal, said transmit terminal comprising a channel control circuit, said circuit comprising:
    an optical coupling means having an optical input and an optical output;
    an optical multiplexer for demultiplexing a WDM optical signal received at the optical input into separate channels;
    a number of optical gain control elements for controlling the signal power of a respective channel to provide pre-emphasis control; and,
    means for coupling each of the channels via a respective return path through the optical multiplexer to the optical output, where the channels appear as a WDM optical signal.

10. An optical wavelength division multiplexed communications system comprising a receive terminal, said receive terminal comprising a channel control circuit, said circuit comprising:
    an optical coupling means having an optical input and an optical output;
    an optical multiplexer for demultiplexing a WDM optical signal received at the optical input into separate channels;
    a number of optical gain control elements for controlling the signal power of a respective channel to provide pre-emphasis control; and,
    means for coupling each of the channels via a respective return path through the optical multiplexer to the optical output, where the channels appear as a WDM optical signal.

11. A receive terminal according to claim 7, further comprising an optical amplifier coupled to the optical output of the optical coupling means.

* * * * *